2 Sheets—Sheet 1.

A. C. EVANS.
Harrow.

No. 225,694. Patented Mar. 23, 1880.

Attest.
M. M. Converse
J. A. Dinwiddie

Inventor.
Austin C. Evans
B. C. Converse, atty.

A. C. EVANS.
Harrow.
No. 225,694. Patented Mar. 23, 1880.
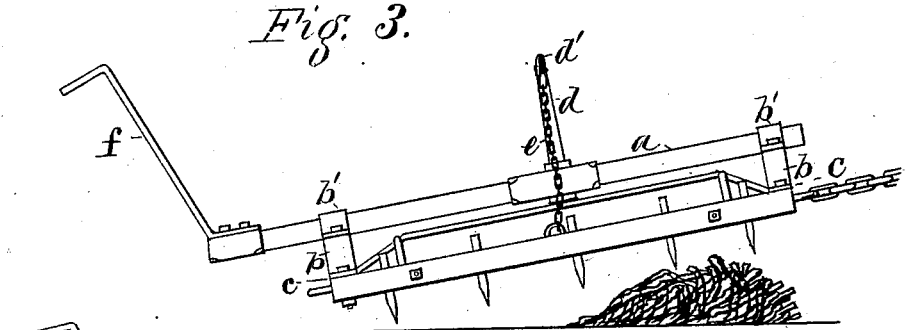
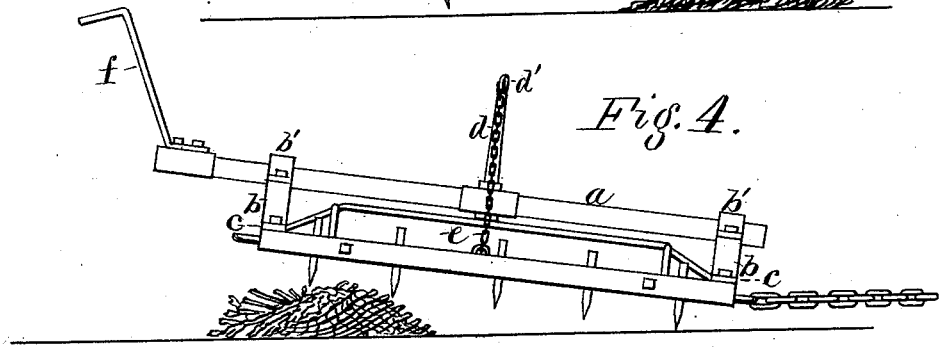
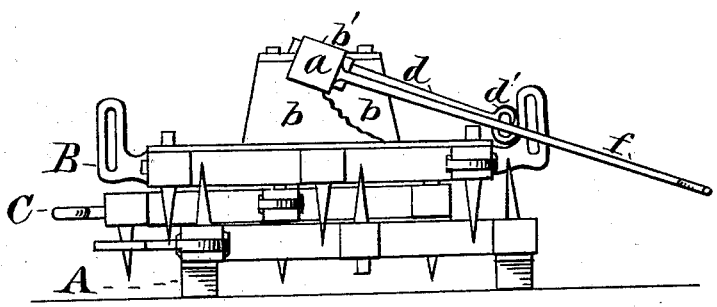

UNITED STATES PATENT OFFICE.

AUSTIN C. EVANS, OF SPRINGFIELD, OHIO.

HARROW.

SPECIFICATION forming part of Letters Patent No. 225,694, dated March 23, 1880.

Application filed January 28, 1880.

*To all whom it may concern:*

Be it known that I, AUSTIN C. EVANS, of the city of Springfield, in the county of Clarke and State of Ohio, have invented a new and useful Improvement in Harrows, of which the following is a specification.

My invention relates to a sectional hinged harrow having three sections connected together; and it consists in mounting thereon, over the middle section, a crank-shaft extending from the front to a little beyond the rear of the harrow-sections. This shaft is pivoted in boxes, and is supported upon blocks bolted upon the front and rear ends of the beams, so as to turn freely. It is placed sufficiently above the harrow to have its crank-handle on the rear end convenient for the operator. An upright post extends from the middle of this shaft, the top of which is formed into an open or lap-ended ring, from which extend two light chains, one on either side, to a staple on the outside beam of the outside section, the object being to enable the operator, by means of the leverage afforded by the crank, to perform four distinct motions, all of which are necessary at times when using the implement to clear it from obstructions of various kinds that may be upon the ground.

Figure 1:
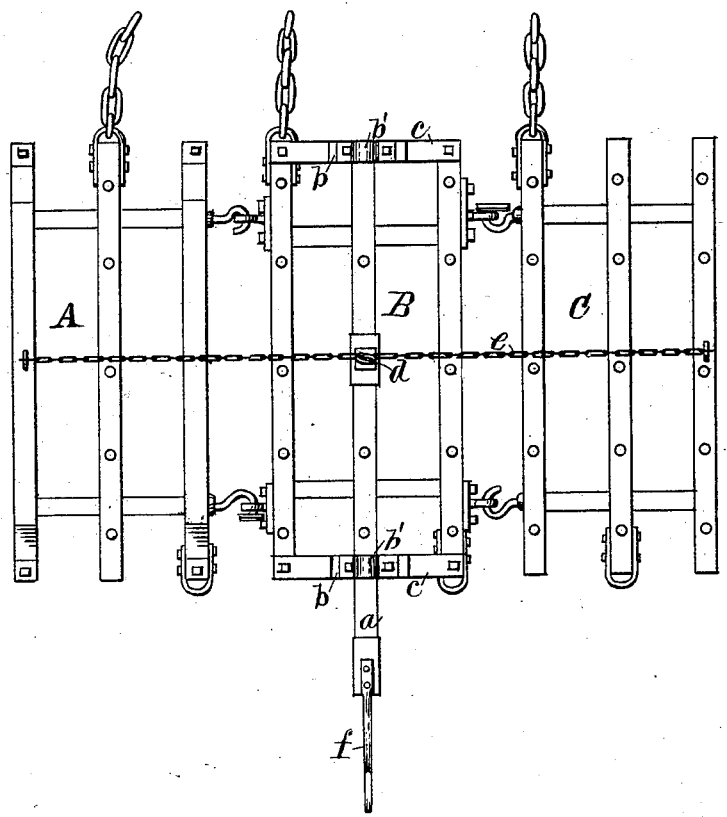
Figure 2:
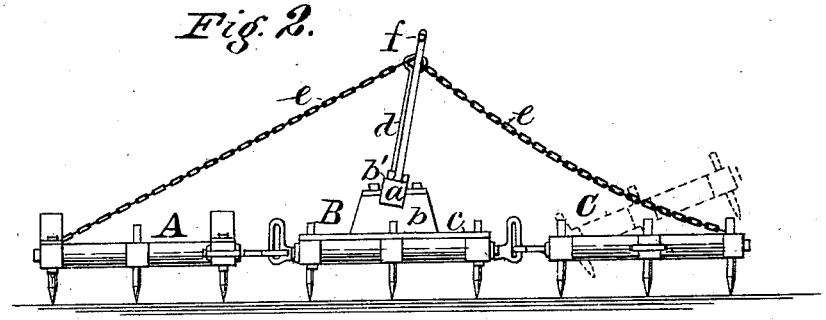

By reference to the several figures in Sheets 1 and 2 the construction and operation of the harrow will be understood, Figure 1 showing a plan of my improved harrow; Fig. 2, a rear elevation; Fig. 3, a side elevation, showing the front end of the harrow elevated to clear it from trash; and Fig. 4, also a side elevation, showing the rear elevated to clear it of trash under that end. In the view Fig. 2 the manner of elevating the side sections is shown in dotted lines, this movement being by a partial rotation of the shaft to the left. Fig. 5 shows the harrow packed for transportation.

In the figures, A B C are the three sections of the harrow. Upon the middle section, B, is mounted the crank-shaft $a$. It consists of a long wooden shaft rounded and pivoted at each end in boxes $b'$ on the upright blocks $b$, which latter are bolted upon a bar, $c$, extending across the ends of the three beams of this section at the front and rear. By this arrangement a firm support is given to the shaft $a$, and the bar $c$ gives additional strength to the middle section. The connections by which the sections are held together are similar to those shown in my improved harrow patented January 13, 1880.

The post $d$ (seen in the several figures) is firmly fastened in the middle of the shaft $a$, and is high enough to elevate the outside of either section A or C by means of its connecting-chain $e$, so as to allow it to pass over any ordinary obstruction, as seen in dotted lines, Fig. 2.

In throwing the crank-lever $f$ toward one side, (giving the shaft $a$ a partial rotation,) and thus elevating the opposite side section, the middle section acts as a fulcrum at the connecting-points, where it is hinged to the former.

At the top of post $d$ is formed the open or split ring $d'$, to which the inner ends of chains $e$ are attached. The object in having this ring split is in order to easily disconnect the chains when packing the harrow-sections for transportation. In packing, the several sections are entirely disconnected and A is inverted, C placed upon A, and B upon top of C, making a pack, as shown in Fig. 5.

I am aware that hinged harrows have been made with a lifting-lever secured to a bar fastened to the side sections and rigidly attached to the lever. I am also aware that harrows have been made with several lifting-levers each hooked at their front ends to the middle sections. I am also aware that corn-stalk cutters have been made with a rotating drum mounted in standards on a frame at one end of the middle section of the cutter, and having chains attached directly to the drum and to the outside sections. Such forms of construction, being essentially different from mine, are not claimed by me. I am not aware, however, that a harrow has been made with a rotating shaft extending entirely across the middle section and provided with an upright post secured to and moving with the rotating shaft and connected with the outside sections by chains attached to or near the top of the post, as fully set forth in the foregoing specification.

I claim as my improvement—

1. A sectional harrow comprised of three sections flexibly connected together, a crank-shaft pivoted centrally over the middle section, as shown, having an upright post thereon connected by chains extending from the top of said post to each outside section, whereby it is adapted, by a partial rotation of said shaft, to elevate either of said outside sections, as hereinbefore set forth.

2. In a harrow comprised of three sections flexibly connected together, the combination of a shaft, pivotally connected at each end with the central section, and provided with a crank-lever secured to the rear end of said shaft for operating the same, with an upright post on the shaft, connected at its top with each outside section and at its bottom with the central section, substantially as and for the purpose set forth.

3. In combination with section B, having bars $c$, blocks $b$, and boxes $b'$, the pivoted shaft $a$, having crank-lever $f$ and upright post $d$, the latter formed with an open or split ring, $d'$, at the top end, for readily connecting and disconnecting the same by chains $e$ to and with the outside sections of a three-section harrow, as shown and specified.

4. In a harrow composed of three sections flexibly connected together, a rotating shaft having a crank-lever attached thereto and extending across the entire length of the middle section on bearings at each end of said section, and connected with the outside sections by chains attached to an upright post secured to and moving with the rotating shaft, substantially as and for the purpose set forth.

AUSTIN C. EVANS.

Attest:
B. C. CONVERSE,
M. M. CONVERSE.